Sept. 23, 1924.

C. HOERL

FRICTION CLUTCH

Filed May 25, 1923

1,509,511

2 Sheets-Sheet 1

INVENTOR.
Conrad Hoerl,
BY
Fraentzel and Richards
ATTORNEYS.

Sept. 23, 1924.

C. HOERL

FRICTION CLUTCH

Filed May 25, 1923

1,509,511

2 Sheets-Sheet 2

INVENTOR.
Conrad Hoerl,
BY
Fraentzel and Richards
ATTORNEYS.

Patented Sept. 23, 1924.

1,509,511

UNITED STATES PATENT OFFICE.

CONRAD HOERL, OF NEWARK, NEW JERSEY.

FRICTION CLUTCH.

Application filed May 25, 1923. Serial No. 641,323.

*To all whom it may concern:*

Be it known that I, CONRAD HOERL, a citizen of the United States, residing at Newark, in the county of Essex and State of New Jersey, have invented certain new and useful Improvements in Friction Clutches; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates, generally, to improvements in friction clutches for power transmission of the general character or type shown and described in my prior United States Letters-Patent #1,073,685, dated September 23rd, 1913; and the invention has reference, more particularly, to a novel construction of friction clutch mechanism for general use, but which is also especially adapted for service in connection with automotive power transmission systems.

The invention has for its principal object to provide a novel construction of friction clutch mechanism provided with expansible clutch elements combined with a simple actuating mechanism whereby the same may be easily moved into operative or service position and also quickly and positively released from such operative or service posision.

The invention has for a further object to provide a novel manually operatable means for adjusting or taking up wear of said expansible clutch elements, whereby the latter are capable of being easily maintained in efficient condition and freed from any tendency to unduly slip or produce lost motion when in operative or service position.

Other objects of this invention not at this time more particularly enumerated, will be clearly understood from the following detailed description of the same.

With the various objects of the invention in view, the same consists, primarily, in the novel construction of friction clutch mechanism hereinafter set forth; and the invention consists, furthermore, in the novel arrangements and combinations of the various devices and parts, as well as in details of the construction of the same, all of which will be hereinafter more fully set forth, and then finally embodied in the claims appended hereto.

The invention is clearly illustrated in the accompanying drawings, in which:—

Figures 1, 4:
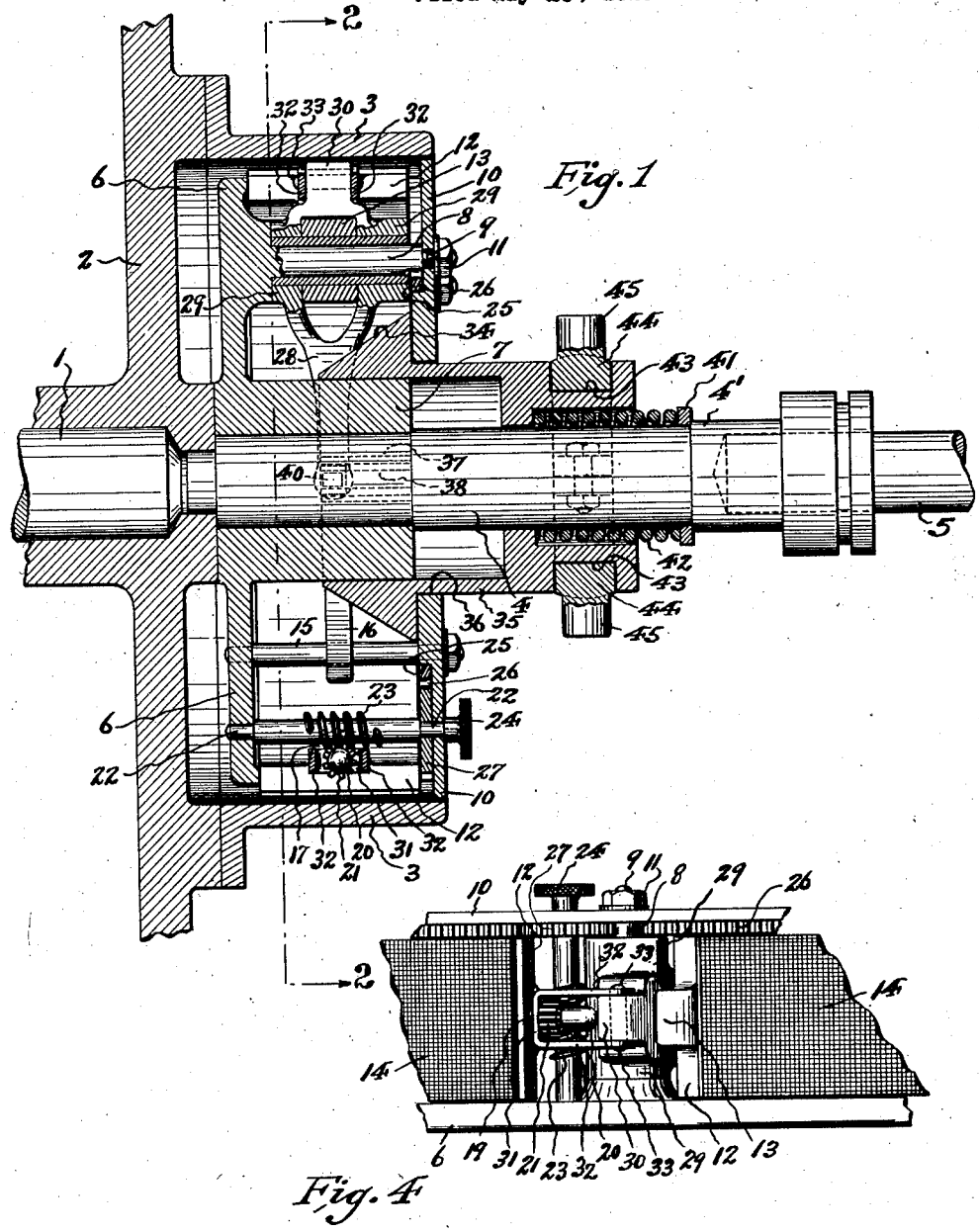
Figure 2:
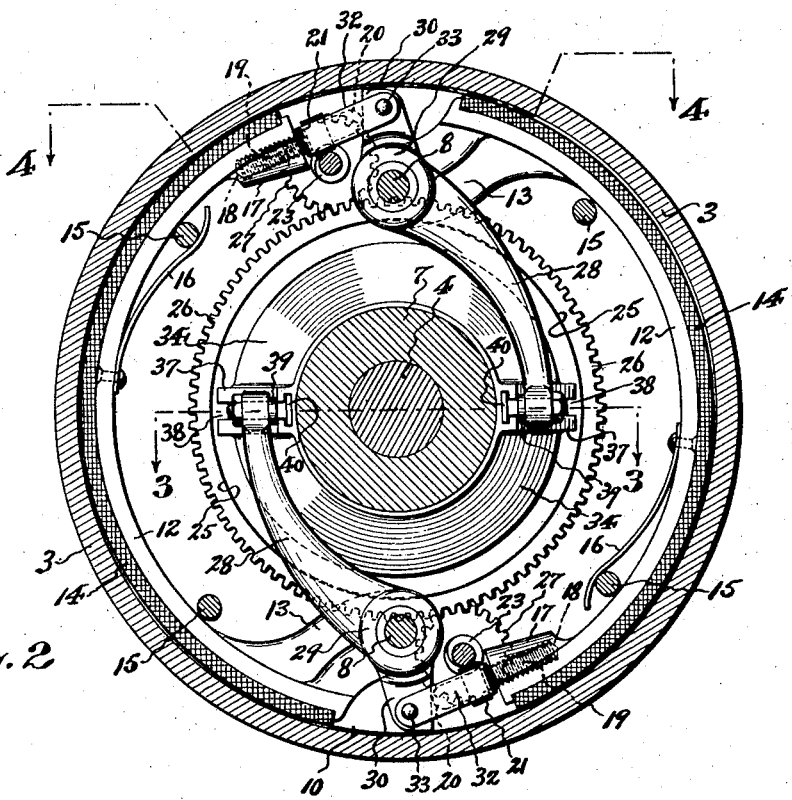
Figure 3:
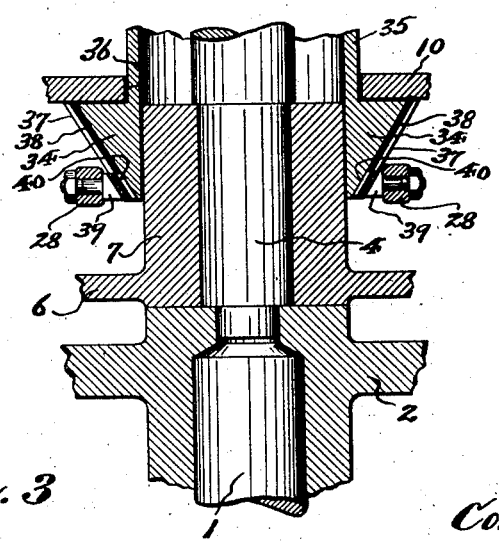

Figure 1 is a longitudinal vertical section of the novel friction clutch mechanism made according to and embodying the principles of the present invention, the same being shown in released position; Figure 2 is a transverse section of the same, taken on line 2—2 in said Figure 1; Figure 3 is a fragmentary horizontal section, taken on line 3—3 in Figure 2; and Figure 4 is a fragmentary horizontal section, taken on line 4—4 in said Figure 2.

Similar characters of reference are employed in all of the hereinabove described views, to indicate corresponding parts.

Referring now to said drawings, the reference character 1 indicates a driving shaft, such, for example, as the crank shaft of an automobile engine, upon which is fixed a fly-wheel 2, or other suitable rotated part, with which is connected an annular friction drum 3, constituting one member of the clutch mechanism.

Alined with the driving shaft 1 is a spindle 4, to the outer end of which may be suitably coupled a driven shaft 5.

The reference character 6 indicates a carrying-disk or plate which is secured by its hub portion 7 upon the inner end of the spindle 4. Said carrying-disk or plate 6 is disposed within the interior of said friction drum 3, and is provided with a pair of diametrically opposite outwardly projecting fulcrum studs 8, having at their outer ends screw-threaded extensions 9 of reduced diameter to extend through a cover-plate 10 which is fitted into the open outer end of the friction drum 3. Fastening nuts 11 are screwed upon the outwardly projecting free ends of said extensions 9.

The reference character 12 indicates a pair of expansible clutch-members, each being provided at one of their ends with an eccentric pivoting arm 13, the latter being respectively pivotally engaged on said respective fulcrum studs 8, so that said clutch members extend around and are opposed to the inner surface of the friction drum 3; the free end of one clutch member terminating adjacent to but short of the pivoted end of the other. Secured upon the outer face of each clutch member 12 is a friction band or lining 14, preferably made of woven asbestos fabric, or a similar or other suitable material. The reference character 15 indicates a plurality of guide or positioning pins, which are secured to and which project outwardly from said carrying-disk or plate 6 so as to extend laterally across and in back of the clutch members 12, whereby the same serve to support said clutch members and determine the released position thereof. In order to aid the movement of said clutch members to released position, each of the same is provided, in fixed attachment to the back thereof adjacent to its free end, with a leaf-spring 16, the free end of which extends over an adjacent guide or positioning pin 15, so that its spring tension tends to pull the clutch member to fully released position, when the clutch member is relieved from actuating expanding pressure.

The free end of each clutch member 12 is provided with a centrally disposed longitudinally directed boss or barrel 17, which is provided with an inwardly extending longitudinal internally screw-threaded opening or socket 18. Adjustably threaded into said opening or socket 18 by its threaded shank portion 19 is a butt or thrust post 20, which thus projects outwardly from the end of said boss or barrel 17 at the free end of said clutch member 12. Fixed on the exterior end portion of each butt or thrust post 20 is a gear or pinion 21. Supported by their opposite journal portions 22, which respectively have their bearing in the carrying-disk or plate 6 and the cover plate 10, are rotatable worm gears 23, which are disposed to operatively mesh respectively with the gears or pinions 21 of the butt or thrust posts 20 of the respective clutch members 12. Fixed on the outer end of each worm gear 23, exteriorly of the cover plate 10 is a knurled finger-piece 24, whereby the worm gears may be manually rotated. Projecting from the inner side of said cover plate 10 is a central bearing boss 25 upon which is journaled an idler ring gear 26, and fixed on each worm gear 23, either as an integral part thereof or otherwise, is a spur gear 27 which operatively meshes with said idler ring gear 26. Said idler ring gear 26 interconnects, through said spur gears 27, both worm gears 23, so that manual rotation of one worm gear will simultaneously transmit equal rotative movement to the other worm gear. The purpose of said worm gears in cooperation with the gears or pinions 21 will be subsequently set forth.

Fulcrumed upon said studs 8 are operating levers or dogs 28, the bearing portions 29 of which straddle the eccentric pivoting arms 13 of the clutch members 12. Projecting outwardly from said operating levers or dogs 28 are cam-portions 30, which are so disposed that the same will operatively engage the free ends of said butt or thrust posts 20 of the clutch members 12, so that when said operating levers or dogs 28 are swung outwardly, the cam-portions 30 will thrust against the butt or thrust posts 20 thus swinging and expanding the clutch members 12 to move the linings 14 thereof into strong frictional engagement with the inner surface of the friction drum 3, thus causing the rotary movement of the latter to be transmitted through the clutch-members 12 and their connections to the carrying-disk or plate 6, spindle 4 and driven shaft 5. Preferably each butt or thrust post 20 is provided with a clevis or yoke strap 31 which extends around the off-side of the gear or pinion 21 (the same having a central perforation through which the threaded shank portion 19 extends), and the arms 32 of which straddle the co-operating cam-portion 30, the former being piotally connected with the latter by a cross-pin 33.

Slidably mounted on the spindle 4 is a wedge-cone 34, the hub-portion 35 of which projects outwardly through a central opening 36 provided in said cover plate 10. Said wedge-cone 34 is provided with a pair of diametrically opposite longitudinal guide-ribs 37 having T-slots 38. The free end of each operating lever or dog 28 is provided with an inwardly projecting rider-stud 39 having a T-shaped shoe 40 at its free end to fit the T-slots 38 of said guide-ribs 37, so that both inward and outward sliding movement of the wedge-cone will positively actuate the operating levers or dogs 28, to produce, in the one case, forcible expansion and movement of the clutch-members 12 to operative frictionally gripping relation to the friction drum 3, and, in the other case, positive releasing or retractive movement of the clutch-members 12 to released relation to the friction drum 3.

In automotive power transmission it is desirable to provide means for normally holding the clutch elements engaged or disposed in "service position," and in such case the spindle 4 may be provided at its outer end with an enlarged portion 4', which serves to back a seating ring 41 against which a strong compression spring 42 is seated so as to operatively exert its thrust upon the wedge-cone hub 35, whereby the wedge-cone is normally thrust inward to actuate the operating levers or dogs 28 to hold the clutch-members 12 operatively engaged with the friction drum 3. The hub-portion 35 of the wedge-cone 34 is provided with an annular groove or seat 43 in which is seated a split collar or shift ring 44 having oppositely projecting studs 45 to permit the operative engagement of a suitable shift lever (not shown) therewith, whereby the wedge-cone 34 may be actuated to thrust and retract the same.

In operation, when the wedge-cone 34 is moved inwardly, the operating levers or dogs 28 are swung outwardly thereby moving the cam-portions 30 against the butt or thrust posts 20 of each clutch member 12, thus exerting a pressure upon the free end of each clutch-member 12 both causing a swinging movement of the same on their pivoted ends and at the same time expanding the same whereby the linings 14 thereof are forced against and caused to conform to the inner surfaces of the friction drum 3, so that a strong frictional engagement of the clutch members with the friction drum is produced whereby the rotation of the latter is transmitted to the former and through the associated parts to the carrying disk or plate 6, spindle 4 and driven shaft 5. The eccentric turning movement and expansion of the clutch members is characterized by the same effects and advantages described in my aforesaid prior United States Letters-Patent. The releasing movement of the clutch-members in the present invention does not depend alone upon the residual tensional reaction of the expanded clutch members 12, but is positively produced when the wedge-cone 34 is withdrawn or retracted, since the engagement of the T-shaped shoes 40 of rider studs 39 of the operating levers or dogs 28 with the T-slots 38 of the guide-ribs 37 of the wedge-cone 34 produces a positive inward swinging movement of said operating levers or dogs 28, which is transmitted from the cam-portions 30 through the clevis or yoke straps 31 as a releasing pull against the gear or pinion 21 and upon the shank 19 of the butt or thrust-posts 20, which positively pulls the clutch-members 12 back to released position. The release of said clutch-members 12 to fully returned and stopped relation against the guide or positioning pins 15 is also aided by the leaf-springs 16, as will be understood from an inspection of Figure 2 of the drawings. The positive release of the clutch members 12 in the above described manner and through the above described agencies is an important improvement over the structure described in my aforesaid prior United States Patent, and renders the clutch mechanism admirably adapted for automotive power transmission.

Another improvement involved in the present invention resides in the novel means for adjusting the clutch-members 12 relative to the friction-drum 3 and to the means for actuating the clutch-members, so that wear on the linings 14 may be readily and easily taken up, and the clutch-mechanism maintained in most efficient service condition at all times. For example, if it is desired to set up the clutch-members 12 a little closer to the friction drum 3, one of the worm gears 23 is rotated by manipulating or turning its knob 24 to transmit, through the meshing gear or pinion 21, a rotation to the butt or thrust post 20, whereby the threaded shank 19 of the latter is turned in the boss or barrel 17 of one clutch member 12 to produce an unscrewing movement thereof. Since, however, the butt or thrust post 20 engages a cam-portion 30 of an operating lever or dog 28, and since the latter parts will not yield, the unscrewing movement of the shank 19 forces the boss or barrel 17 to travel outwardly on said shank 19, and consequently the clutch-member 12 is slightly expanded to set the same up a little closer to the friction drum 3. It is desirable that such adjustment of one clutch member 12 shall be equally effected as to the other clutch member, and consequently I provide the idler ring-gear 26 which is intermeshed between the spur-gears 27 of the respective worm gears 23, so that no matter which of the latter is manually operated a similar corresponding operation will be transmitted equally to the other, and consequently both clutch members 12 will be simultaneously and equally adjusted relative to the friction drum 3 and to the mechanism for actuating said clutch-members.

From the above description it will be quite evident that I have embodied in the present invention considerable improvement in clutch mechanisms of the general character shown and described in my aforesaid United States Letters-Patent, while nevertheless retaining in the present improved structure the basic principles of construction and operation, and the advantages founded thereon, which characterized my aforesaid prior patented clutch-mechanism.

I am aware that some changes may be made in the various arrangements and combinations of the several devices and parts of my present invention, without departing from the scope thereof as above described and as defined in the appended claims. Hence, I do not limit my invention to the exact arrangements and combinations as described in the foregoing specification nor do I confine myself to the exact details of the construction of said parts as illustrated in the accompanying drawings.

I claim:—

1. A friction clutch mechanism, comprising a rotatable friction drum, a carrying-disk within said friction drum, eccentrically pivoted expansible clutch members supported by said carrying disk, operating levers also pivotally supported by said carrying disk, said operating levers having cam-portions connected with the free ends of said clutch members to turn the latter on their pivotal connections while at the same time expanding the same to frictionally engage said friction drum, a wedge cone longitudinally movable relative to the axis of said carrying-disk, said wedge-cone having longitudinal guide ribs provided with T-slots, and said operating levers having at their inner ends rider studs provided with T-shaped shoes to engage in said T-slots of the guide ribs of said wedge-cone.

2. A friction clutch mechanism, comprising a rotatable friction drum, a carrying disk within said friction drum, eccentrically pivoted expansible clutch members supported by said carrying disk, said clutch members having linings of suitable frictional material on their outer faces, operating levers also pivotally supported by said carrying disk, said operating levers having cam-portions, means interconnecting said cam-portions respectively with the free ends of said clutch members, a wedge-cone longitudinally movable relative to the axis of said carrying disk, said wedge-cone having longitudinal guide ribs provided with T-slots, and said operating levers having at their inner ends rider studs provided with T-shaped shoes to engage in said T-slots of the guide-ribs of said wedge-cone.

3. A friction clutch mechanism, comprising a rotatable friction drum, a carrying disk within said friction drum, eccentrically pivoted expansible clutch members supported by said carrying-disk, operating levers also pivotally supported by said carrying-disk, said operating levers having cam portions at their outer ends, adjustable thrust posts projecting from the free ends of the clutch-members to receive the actuating thrust of said cam-portions, means for yoking said cam-portions to said thrust posts to transmit the releasing pull of the former to the latter, and means for positively swinging said operating levers in each direction to positively actuate and release said clutch members.

4. A friction clutch mechanism, comprising a rotatable friction drum, a carrying disk within said friction drum, eccentrically pivoted expansible clutch members supported by said carrying-disk, operating levers also pivotally supported by said carrying-disk, said operating levers having cam portions at their outer ends, thrust posts projecting from the free ends of the clutch-members to receive the actuating thrust of said cam-portions, means for yoking said cam-portions to said thrust posts to transmit the releasing pull of the former to the latter, a wedge-cone longitudinally movable relative to the axis of said carrying disk, said wedge-cone having longitudinal guide ribs provided with T-slots, and said operating levers having at their inner ends rider studs provided with T-shaped shoes to engage in said T-slots of the guide ribs of said wedge-cone.

5. A friction clutch mechanism, comprising a rotatable friction drum, a carrying disk within said friction drum, eccentrically pivoted expansible clutch members supported by said carrying disk, operating levers also pivotally supported by said carrying disk, said operating levers having cam-portions at their outer ends, thrust-posts having screw-threaded shanks threaded into the free ends of the clutch-members, each thrust post having a pinion fixed on its outer portion, said cam-portions being adapted to operatively engage the outer free ends of said thrust posts, clevis yokes disposed around said pinions with their arms embracing and pivotally connected with said cam-portions, worm gears rotatably supported by said carrying disk to mesh with said pinions of said thrust posts, means for manually rotating said worm gears for the purposes described, and means for positively swinging said operating levers in each direction to positively actuate and release said clutch members.

6. A friction clutch mechanism, comprising a rotatable friction drum, a carrying disk within said friction drum, eccentrically pivoted expansible clutch members supported by said carrying disk, operating levers also pivotally supported by said carrying disk, said operating levers, having cam-portions at their outer ends, thrust-posts having screw-treaded shanks threaded into the free ends of the clutch-members, each thrust post having a pinion fixed on its outer portion, said cam-portions being adapted to operatively engage the outer free ends of said thrust posts, clevis yokes disposed around said pinions with their arms embracing and pivotally connected with said cam-portions, worm gears rotatably supported by said carrying disk to mesh with said pinions of said thrust posts, means for manually rotating said worm gears for the purposes described, a wedge-cone longitudinally movable relative to the axis of said carrying disk, said wedge-cone having longitudinal guide ribs provided with T-slots, and said operating levers having at their inner ends rider studs provided with T-shaped shoes to engage in said T-slots of the guide ribs of said wedge-cone.

7. A friction clutch mechanism, comprising a rotatable friction drum, a carrying disk within said friction drum, eccentrically pivoted expansible clutch-members supported by said carrying disk, operating levers also pivotally supported by said carrying disk, said operating levers having cam-portions at their outer ends, thrust-posts having screw-threaded shanks threaded into the free ends of the clutch-members, each thrust post having a pinion fixed on its outer portion, said cam-portions being adapted to operatively engage the outer free ends of said thrust posts, clevis yokes disposed around said pinions with their arms embracing and pivotally connected with said cam-portions, a cover-plate outwardly spaced and supported in connection with said carrying disk, worm gears journaled at their respective ends in said carrying disk and cover plate, a finger piece fixed on the outer end of each worm gear exteriorly of said cover plate, said worm gears respectively meshing with said pinions of said thrust posts, spur gears fixed in connection with each worm gear, said cover plate having a central bearing boss on its inner face, an idler ring gear rotatably mounted on said bearing boss to intermesh with said spur gears of the said worm gears, and means for positively swinging said operating levers in each direction to positively actuate and release said clutch members.

8. A friction clutch mechanism, comprising a rotatable friction drum, a carrying disk within said friction drum, eccentrically pivoted expansible clutch members supported by said carrying disk, operating levers also pivotally supported by said carrying disk, said operating levers having cam-portions at their outer ends, thrust-posts having screw-threaded shanks threaded into the free ends of the clutch-members, each thrust post having a pinion fixed on its outer portion, said cam-portions being adapted to operatively engage the outer free ends of said thrust posts, clevis yokes disposed around said pinions with their arms embracing and pivotally connected with said cam-portions, a cover-plate outwardly spaced and supported in connection with said carrying disk, worm gears journaled at their respective ends in said carrying disk and cover plate, a finger piece fixed on the outer end of each worm gear exteriorly of said cover plate, said worm gears respectively meshing with said pinions of said thrust posts, spur gears fixed in connection with each worm gear, said cover plate having a central bearing boss on its inner face, an idler ring gear rotatably mounted on said bearing boss to intermesh with said spur gears of the said worm gears, a wedge-cone longitudinally movable relative to the axis of said carrying disk, said wedge-cone having longitudinal guide ribs provided with T-slots, and said operating levers having at their inner ends rider studs provided with T-shaped shoes to engage in said T-slots of the guide ribs of said wedge-cone.

9. A friction clutch mechanism, comprising a rotatable friction drum, a carrying disk within said friction drum, eccentrically pivoted expansible clutch members supported by said carrying disk, operating levers also pivotally supported by said carrying disk, said operating levers having cam-portions at their outer ends, thrust-posts having screw-threaded shanks threaded into the free ends of the clutch-members, each thrust post having a pinion fixed on its outer portion, said cam-portions being adapted to operatively engage the outer free ends of said thrust posts, clevis yokes disposed around said pinions with their arms embracing and pivotally connected with said cam-portions, a cover-plate outwardly spaced and supported in connection with said carrying disk, worm gears journaled at their respective ends in said carrying disk and cover plate, a finger piece fixed on the outer end of each worm gear exteriorly of said cover-plate, said worm gears respectively meshing with said pinions of said thrust posts, spur gears fixed in connection with each worm gear, said cover plate having a central bearing boss on its inner face, an idler ring gear rotatably mounted on said bearing boss to intermesh with said spur gears of the said worm gears, means for positively swinging said operating levers in each direction to positively actuate and release said clutch members, positioning pins extending between said carrying disk and said cover-plate in back of each clutch member, and each clutch member having fixed to its back a leaf-spring the free end of which is operatively engageable with one of said positioning pins.

10. A friction clutch mechanism, comprising a rotatable friction drum, a carrying disk within said friction drum, eccentrically pivoted expansible clutch members supported by said carrying disk, operating levers also pivotally supported by said carrying disk, said operating levers having cam-portions at their outer ends, thrust-posts having screw-threaded shanks threaded into the free ends of the clutch-members, each thrust post having a pinion fixed on its outer portion, said cam-portions being adapted to operatively engage the outer free ends of said thrust posts, clevis yokes disposed around said pinions with their arms embracing and pivotally connected with said cam-portions, a cover-plate outwardly spaced and supported in connection with said carrying disk, worm gears journaled at their respective ends in said carrying disk and cover plate, a finger piece fixed on the outer end of each worm gear exteriorly of said cover plate, said worm gears respectively meshing with said pinions of said thrust posts, spur gears fixed in connection with each worm gear, said cover plate having a central bearing boss on its inner face, an idler ring gear rotatably mounted on said bearing boss to intermesh with said spur gears of the said worm gears, a wedge-cone longitudinally movable relative to the axis of said carrying disk, said wedge-cone having longitudinal guide ribs provided with T-slots, and said operating levers having at their inner ends rider studs provided with T-shaped shoes to engage in said T-slots of the guide ribs of said wedge-cone, positioning pins extending between said carrying disk and said cover plate in back of each clutch-member, and each clutch member having fixed to its back a leaf-spring the free end of which is operatively engageable with one of said positioning pins.

11. In a clutch mechanism, an eccentrically pivoted and expansible clutch member, a pivoted operating lever having a cam-portion, an adjustable thrust post threaded into and projecting from the free end of said clutch member to engage said cam-portion of said operating lever, means for rotating said thrust post to adjust the clutch member, and a clevis means interconnecting said thrust post with said cam portion of said operating lever.

12. In a clutch mechanism, an eccentrically pivoted and expansible clutch member, a pivoted operating lever having a cam-portion, an adjustable thrust post threaded into and projecting from the free end of said clutch member to engage said cam-portion of said operating lever, a pinion fixed on the outer portion of said thrust post, a manually rotatable worm gear meshing with said pinion of said thrust post, and a clevis means extending around said pinion with its arms embracing and pivotally connected with said cam portion of said operating lever.

13. In a clutch mechanism, an eccentrically pivoted and expansible clutch member, a pivoted operating lever having a cam-portion, an adjustable thrust post threaded into and projecting from the free end of said clutch member to engage said cam-portion of said operating lever, a pinion fixed on the outer portion of said thrust post, a manually rotatable worm gear meshing with said pinion of said thrust post, a clevis means extending around said pinion with its arms embracing and pivotally connected with said cam portion of said operating lever, and means for positively swinging said operating lever in each direction for the purposes described.

14. In a clutch mechanism, an eccentrically pivoted and expansible clutch member, a pivoted operating lever having a cam-portion, an adjustable thrust post threaded into and projecting from the free end of said clutch member to engage said cam-portion of said operating lever, a pinion fixed on the outer portion of said thrust post, a manually rotatable worm gear meshing with said pinion of said thrust post, a clevis means extending around said pinion with its arms embracing and pivotally connected with said cam portion of said operating lever, a wedge-cone having a longitudinal guide rib provided with a T-slot, and said operating lever having at its inner end a rider stud provided with a T-shaped shoe to engage in said T-slot of the guide rib of said wedge-cone.

In testimony, that I claim the invention set forth above I have hereunto set my hand this 24th day of May, 1923.

CONRAD HOERL.

Witnesses:
GEORGE D. RICHARDS,
EVA E. DESCH.